US012139846B2

(12) United States Patent
Hudson

(10) Patent No.: US 12,139,846 B2
(45) Date of Patent: Nov. 12, 2024

(54) SHOELACE CLEANING DEVICE

(71) Applicant: KICK INNOVATIONS, LLC, Mableton, GA (US)

(72) Inventor: David Hudson, Mableton, GA (US)

(73) Assignee: KICK INNOVATIONS, LLC

( * ) Notice: Subject to any disclaimer, the term of this patent is extended or adjusted under 35 U.S.C. 154(b) by 468 days.

(21) Appl. No.: 17/308,705

(22) Filed: May 5, 2021

(65) Prior Publication Data

US 2021/0348323 A1 Nov. 11, 2021

Related U.S. Application Data

(60) Provisional application No. 63/020,608, filed on May 6, 2020.

(51) Int. Cl.

*D06F 95/00* (2006.01)
*A47L 23/28* (2006.01)
*B08B 11/02* (2006.01)
*B08B 3/04* (2006.01)
*D06F 1/12* (2006.01)

(52) U.S. Cl.

CPC ............ *D06F 95/008* (2013.01); *A47L 23/28* (2013.01); *B08B 11/02* (2013.01); *B08B 3/047* (2013.01); *D06F 1/12* (2013.01)

(58) Field of Classification Search

CPC ....... B08B 3/047; B08B 11/02; D06F 95/008; D06F 95/006; A47L 23/28

See application file for complete search history.

(56) References Cited

U.S. PATENT DOCUMENTS

| | | | | |
|---|---|---|---|---|
| 2007/0056997 A1* | 3/2007 | Radtke | D06F 95/008 223/84 |
| 2009/0078725 A1* | 3/2009 | Phan | D06F 95/008 223/66 |
| 2017/0260672 A1* | 9/2017 | Keyes | D06F 1/00 |

FOREIGN PATENT DOCUMENTS

| | | | | |
|---|---|---|---|---|
| CN | 203007652 U * | 6/2013 | |
| GB | 2444478 A * | 6/2008 | A47L 4/04 |

* cited by examiner

*Primary Examiner* — Joseph L. Perrin
*Assistant Examiner* — Kevin G Lee
(74) *Attorney, Agent, or Firm* — Perilla Knox & Hildebrandt LLP; Stephanie L. Davy-Jow; Bradley K Groff

(57) ABSTRACT

A shoelace cleaning device for containing at least one shoelace during the washing thereof. The device includes at least one perforated containment shell and central hub. In some example embodiments, the shoelace cleaning device can function as a shoe tree or shoe shaping/structuring device. A shoe cleaning device is also disclosed.

8 Claims, 5 Drawing Sheets

SHOELACE CLEANING DEVICE

CROSS-REFERENCE TO RELATED APPLICATION

This application claims the benefit of U.S. Provisional Patent Application Ser. No. 63/020,608 filed May 6, 2020, the entirety of which is hereby incorporated herein by reference for all purposes.

TECHNICAL FIELD

The present invention relates generally to the field of devices for cleaning clothing, garments and/or accessories for use therewith, and more particularly to cleaning devices, containment apparatuses and to methods of cleaning shoelaces that the present invention is primarily directed.

SUMMARY OF THE INVENTION

In example embodiments, the present invention provides a device for containing one or more shoelaces during the cleaning thereof. According to example embodiments, the present invention includes a perforated container having at least one containment space for containing one or more shoelaces. According to example embodiments, the perforated container, while containing one or more shoelaces therein, can be placed within a washing device (e.g., washing machine according to one example) so as to permit the cleaning of the one or more shoelaces while containing the same within the at least one containment space of the perforated container.

In one aspect, the present invention relates to a device having a multi-piece perforated container defining at least two containment spaces for at least temporarily containing one or more shoelaces during the washing thereof. According to example embodiments, a central hub includes opposite threaded ends that are configured for attachment with perforated containment shells. According to one example, the assembled device is generally pill-shaped. In example embodiments, the central hub includes an engagement member for suspending or hanging the same from an engagement member and at least two receivers are formed within a portion of the central hub for receiving ends of the at least one shoelace.

In example embodiments, after the washing thereof, a drying method can be provided so as to dry the one or more shoelaces. According to one example, the at least one shoelace is looped through a portion of one of the perforated containment shells and the ends of the at least one shoelace are connected with the at least two receivers of the central hub. With the engagement member suspending the central hub, the perforated containment shell is suspended below the central hub by the at least one shoelace.

In another aspect, the present invention relates to a reconfigurable shoelace cleaning-and-drying system for containing one or more shoelaces through at least one wash cycle in a first washing configuration and retaining the one or more shoelaces to hang dry from an elevated anchor point in a second drying configuration. According to one example embodiment, the reconfigurable shoelace cleaning system includes a central hub and at least one perforated containment shell. The central hub includes at least one locking protrusion, a string loop for suspending the central hub from the elevated anchor point, and one or more receivers configured to releasably retain ends of the one or more shoelaces in the first washing and second drying configurations. The at least one perforated containment shell includes an open end and a closed end opposite the open end. The open end comprises a locking groove configured to interlock with the at least one locking protrusion of the central hub in the first washing configuration. The closed end comprises a clasp adapted to detachably grip onto and weigh down at least a portion of the one or more shoelaces in the second drying configuration These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 4 shows a central hub of the shoelace cleaning device of FIG. 2 and a shoelace secured to the central hub according to an example method of use.

DETAILED DESCRIPTION OF EXAMPLE EMBODIMENTS

Figure 1:
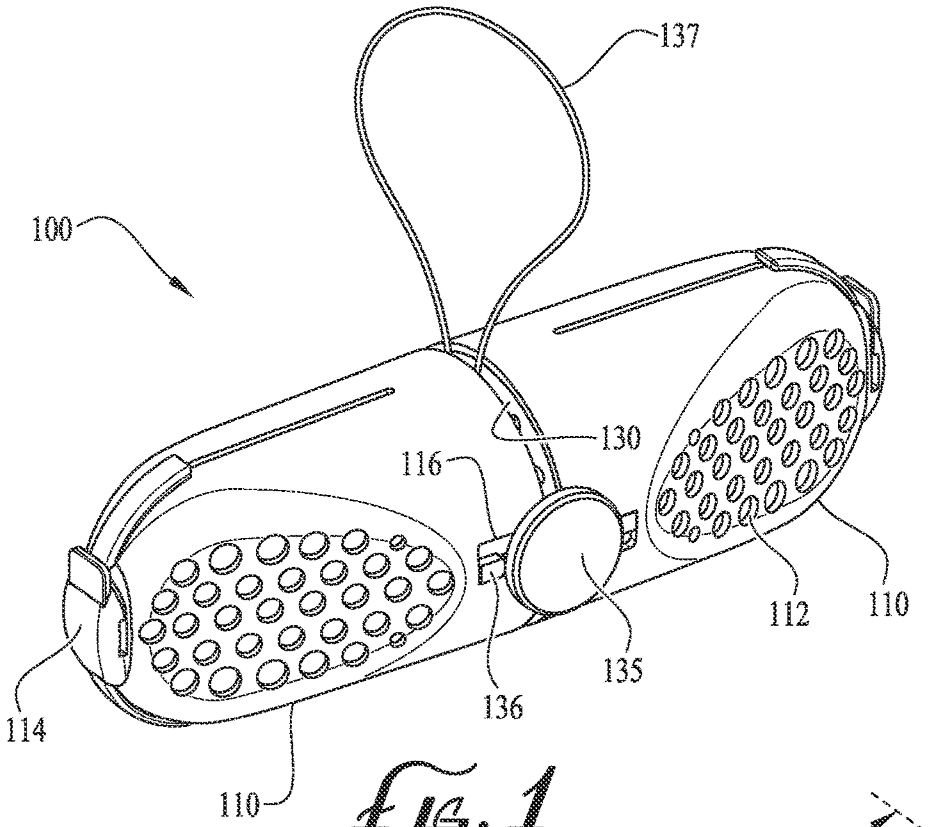
FIG. 1 shows a top perspective view of a shoelace cleaning device according to an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, FIGS. 1-4 show a shoelace cleaning device according to an example embodiment of the present invention. Generally, the present invention provides a device for containing one or more shoelaces during the cleaning thereof. According to example embodiments, the present invention includes a perforated or porous container having at least one containment space for containing one or more shoelaces. According to example embodiments, the perforated container, while containing one or more shoelaces therein, can be placed within a washing device (e.g., clothes washing machine according to one example) so as to permit the cleaning of the one or more shoelaces while containing the same within the at least one containment space of the porous container.

Figure 2:
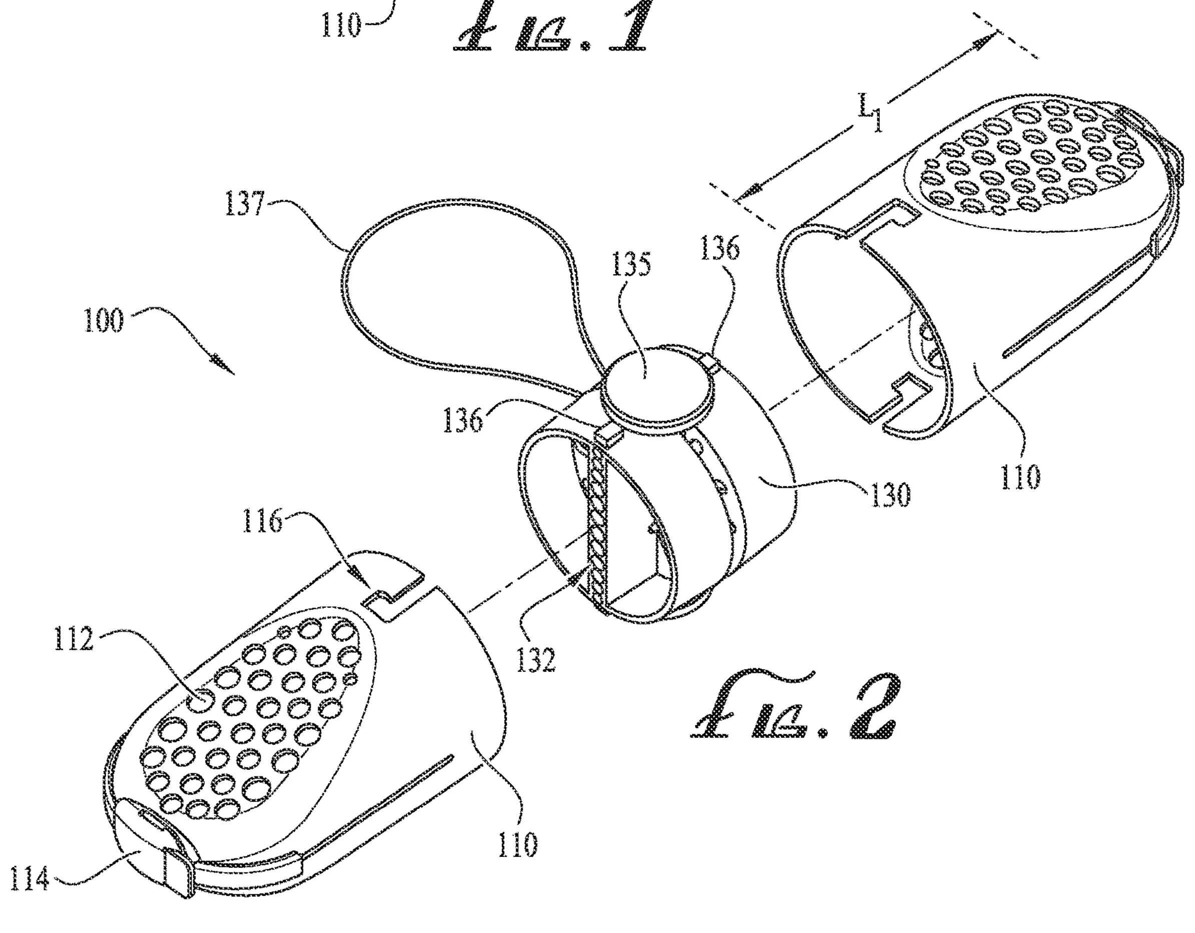
FIG. 2 is an exploded view of the shoelace cleaning device of FIG. 1.
Figure 1:
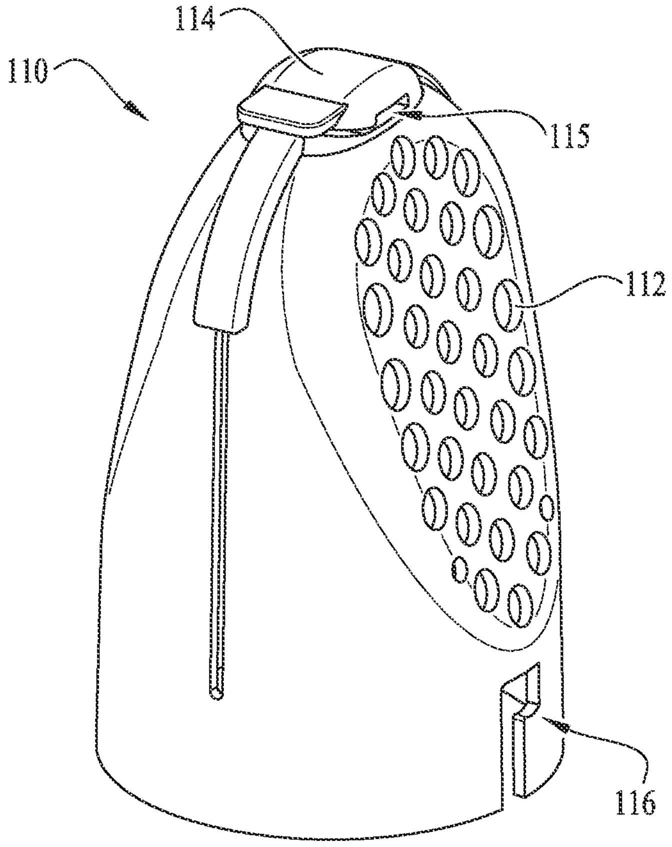

FIG. 1 shows a shoelace cleaning device 100 according to one example embodiment of the present invention. In example embodiments, the shoelace cleaning device 100 comprises a multi-piece perforated container defining at least one containment space for at least temporarily containing one or more shoelaces during the washing thereof. For example, as shown in FIGS. 1-2, the shoelace cleaning device 100 comprises a three-piece container including a central hub 130 and two perforated containment shells 110.

According to example embodiments, the central hub 130 comprises one or more locking protrusions 136, a coupling member 137 and one or more shoelace-end receivers 132. In example embodiments, the central hub 130 includes opposite ends that are configured for attachment with the perforated containment shells (see FIG. 2). For example, according to example embodiments, the central hub includes a plurality of locking protrusions 136 configured to interlock with corresponding locking grooves 116 on the perforated containment shells 110. In some example embodiments, the central hub includes internal and/or external threads adapted to engage corresponding threads on the perforated containment shells. In still other example embodiments, open ends of the containment shells are configured to slide over the central hub for a friction fit engagement. When secured together, the central hub 130 and the containment shells 110 define containment spaces for holding one or more shoelaces during the cleaning thereof.

Figure 3:
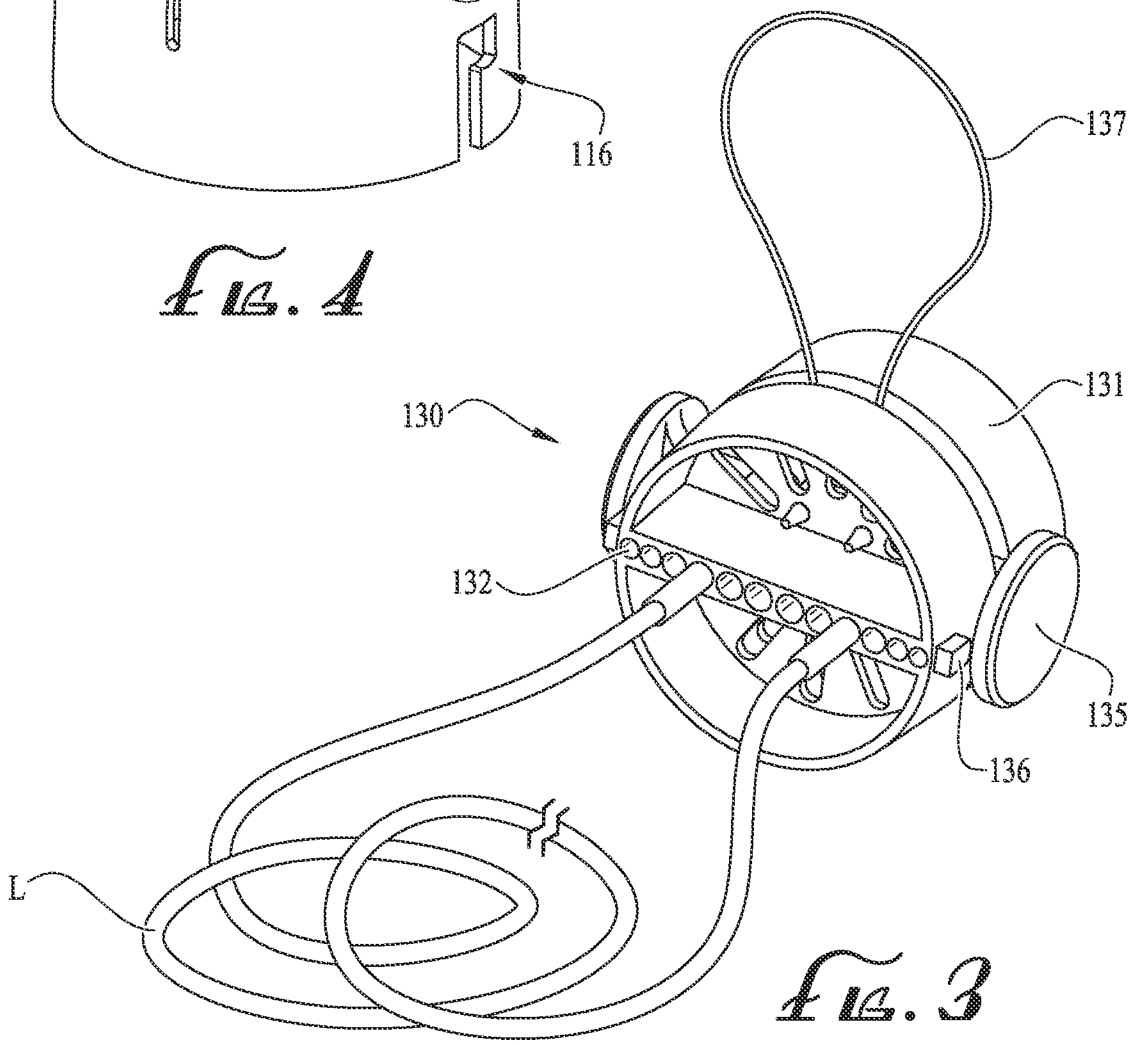
FIG. 3 shows a perforated containment shell of the shoelace cleaning device of FIG. 2.

FIG. 3 shows a central hub 130 according to an example embodiment of the present invention. In example embodiments, the central hub 130 includes one or more receivers 132 formed within a portion of the central hub for receiving ends of the one or more shoelaces L. In example embodiments, the receivers 132 are circular holes configured to receive shoelace ends of different sizes. For example, as shown in FIG. 3, the central hub comprises a plurality of receivers 132 of varying diameters such as to allow use of the central hub with a variety of shoelaces. In example embodiments, the shoelace ends or aglets are held in place in the receivers 132 essentially by means of friction fit. In some example embodiments, the receivers 132 can comprise rubber or other flexible material to accommodate different sizes and shapes of shoelace ends.

Figure 5:
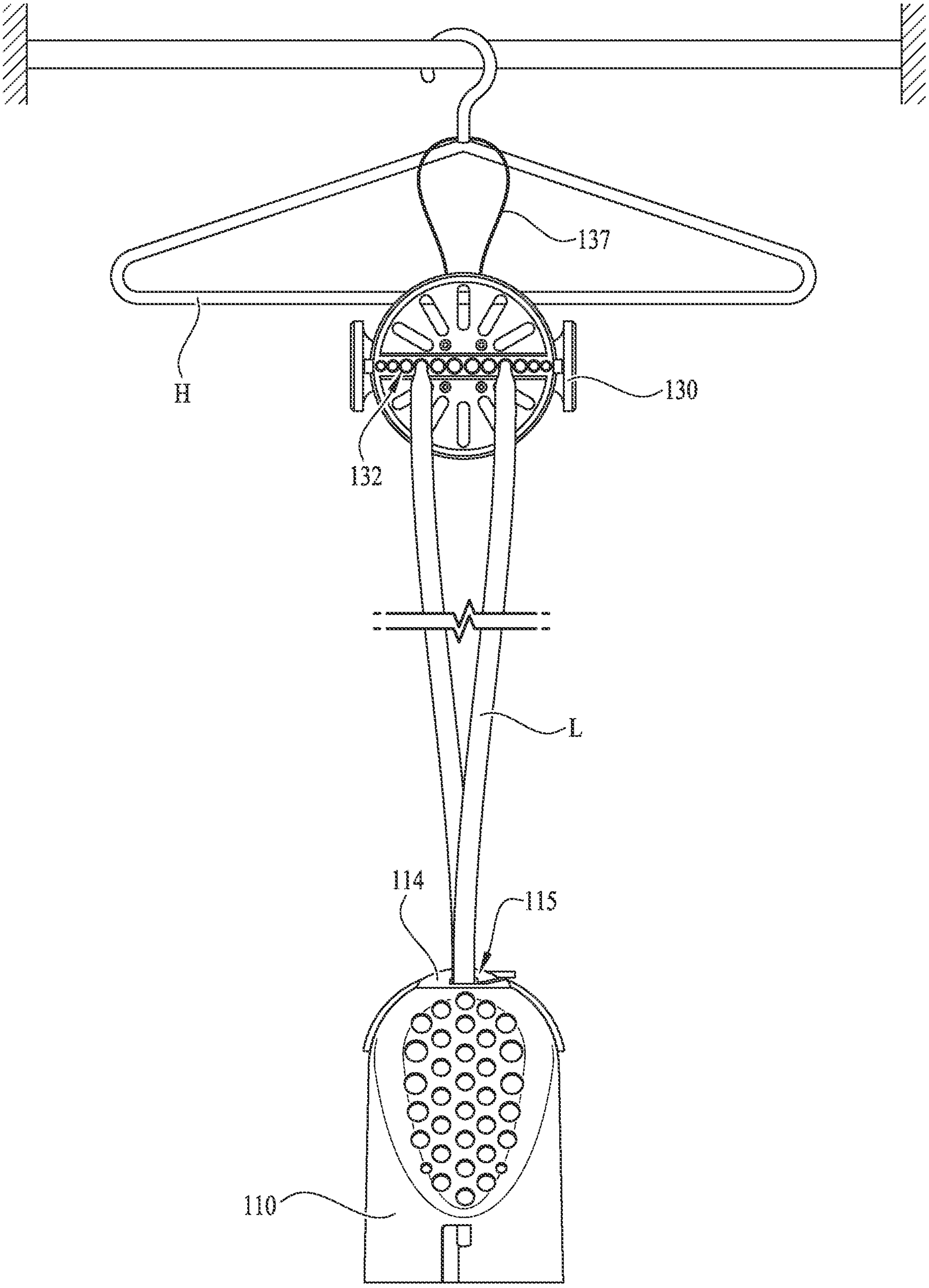
FIG. 5 shows the shoelace cleaning device of FIG. 1 as used to hang dry a shoelace from a clothes hanger according to an example method of use.

In example embodiments, the central hub 130 also includes at least one coupling member 137. The coupling member 137 is adapted to hang or suspend the central hub 137 from an elevated anchor point in any applicable environment or surrounding. For example, according to example embodiments, the coupling member 137 is a string or yarn loop attached to the central hub 130. The loop 137 can be secured to any elevated anchor or securing point, such as for example, door knobs, wall hooks, curtain hooks, cabinet and drawer handles, or any other ledge or overhang commonly found in homes and other living areas. In situations where the loop 137 cannot be directly secured to the anchor point (e.g., a bar with both ends fixed to a wall as shown in FIG. 5), the central hub 130 can be hung by incorporating another hanging system, for example a clothes hanger H, secured to the anchor point. In other example embodiments, the coupling member 137 can be a hook, clasp or other suitable hanging or clamping mechanisms for securing the central hub 130 to an appropriate anchor point.

In example embodiments, the central hub 130 includes one or more bumpers 135. In example embodiments, the bumpers 135 are made of rubber and protrude externally from the central hub 130 such as to act as a cushion or shock absorber protecting the shoelace cleaning device 100 during washing cycles. For example, the bumpers can protect at least portions of the sides of the device 100 from hard impacts while the device 100 tumbles or otherwise moves about within a washing machine. In another example, the bumpers can reduce wear and tear by reducing the number or force of other items colliding with the device 100 in the washing device (e.g., washing machine) during the washing cycle. In example embodiments, words, designs and or logos can be inscribed or otherwise provided on the surfaces of the bumper 135. In some example embodiments, the bumpers provide a surface on which users of the shoelace cleaning device 100 can inscribe their own identifying designation or information. In other example embodiments, the bumpers can be made from silicone, nitrile, neoprene, vinyl or any suitable material to provide cushion to the exterior of the device 100, and/or any combination thereof. In the depicted embodiment, the bumpers 135 comprise a circular surface profile but other shapes and configurations may be used.

FIG. 4 shows a containment shell 110 according to an example embodiment of the present invention. Generally, the containment shells 110 comprise hollow tubular bodies having an open end and a closed end, and define containment spaces therein. According to example embodiments, the hollow bodies of the containment shells 110 are adapted to hold and contain one or more shoelaces in the containment spaces during the cleaning thereof. In example embodiments, the containment shell 110 includes a plurality of perforations 112 covering at least a portion of the tubular body. According to example embodiments, the plurality of perforations 112 permit the flow of washing mediums, such as for example water or solutions of water and detergent, and air therethrough. In some example embodiments, the perforations 112 are specifically shaped and placed about the containment shells 110 to promote turbulent and/or laminar flow of the washing mediums within the containment spaces to control or improve agitation of the shoelaces contained therein and cleaning thereof.

Figure 6:
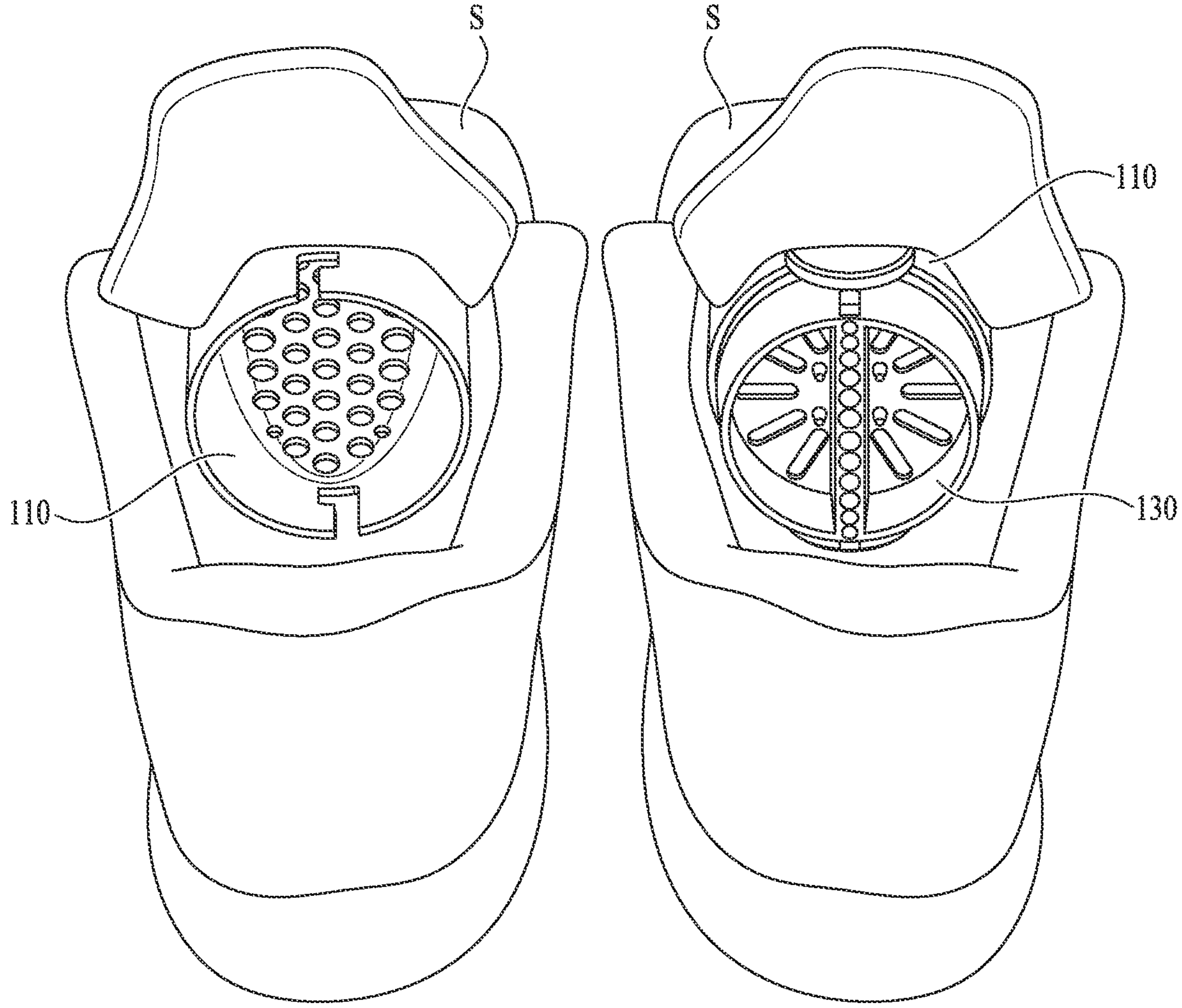
FIG. 6 shows the shoelace cleaning device of FIG. 1 as used to ventilate and maintain the shape of a pair of shoes according to another example method of use.

In example embodiments, the containment shells 110 are wedge-shaped and include one or more sloped flat surfaces, as shown in FIG. 3. According to example embodiments, the perforations 112 are substantially positioned on and cover the sloped flat surfaces. According to example embodiments, the one or more sloped flat surfaces allow the containment shells 110 to be more easily slipped inside shoes S when the containment shells 110 are used to preserve the shapes of the shoes, for example like a shoe tree, as shown in FIG. 6 and described in more detail below. In example embodiments, the containment shells comprise a length $L_1$ between about 4 inches and 6 inches, or more preferably between about 4.5 inches and 5.5 inches. In some example embodiments, the containment shells may be conical, duck-bill shaped, rounded or shaped in any other suitable shape or form to fit inside a shoe. In optional example embodiments, the cleaning device can comprise one or more components and can be shaped and sized as desired.

In example embodiments, the open ends of the containment shells 110 are adapted to fit over or otherwise mate with the central hub 130. According to example embodiments, the containment shells 110 include one or more locking grooves or channels 116 adapted to releasably engage the one or more locking protrusions 136 of central hub 130. For example, to secure the containment shells 110 to the central hub 130, the open ends of the containment shells 110 are first axially aligned to the central hub and then pressed onto the central hub while aligning the openings of the locking grooves 116 to the locking protrusions 136. The containment shells are then twisted to lock the containment shells 110 to the central hub 130. To remove the containment shells 110 from the central hub 130, the containment shells are twisted in the opposite direction and pulled off of the central hub. In some example embodiments, the central hub 130 and containment shells 110 include reciprocal threads for a threaded engagement. In other example embodiments, the containment shells 110 may be fastened to the central hub 130 using snap-fit systems, hook-and-loop systems, temporary adhesives, and other suitable and known mechanical attachment means.

In example embodiments, the containment shells 110 include clasps 114. In example embodiments, the clasps 114 are secured to the closed ends of the containment shells 110 to act as additional cushion or shock absorbers, and are further configured to receive and grip onto at least portions of the shoelaces. According to example embodiments, the clasps 114 include grooves or channels 115 configured to slide or slip therethrough at least portions of the shoelaces. In example embodiments, the clasps are made of rubber and/or silicone which provides protection to at least portions of the containment shells 110 and also allows the clasps to be manipulated easily when securing the containment shells 110 to the shoelaces L, as shown in FIG. 5. Additionally, the higher friction from rubber and/or silicone materials provides additional gripping force to secure the containment shells 110 to the shoelaces L. However, the clasps can be made from a variety of other suitable materials, such as for example, rubber, silicone, nitrile, neoprene and/or vinyl, and/or combinations thereof.

Figure 7:
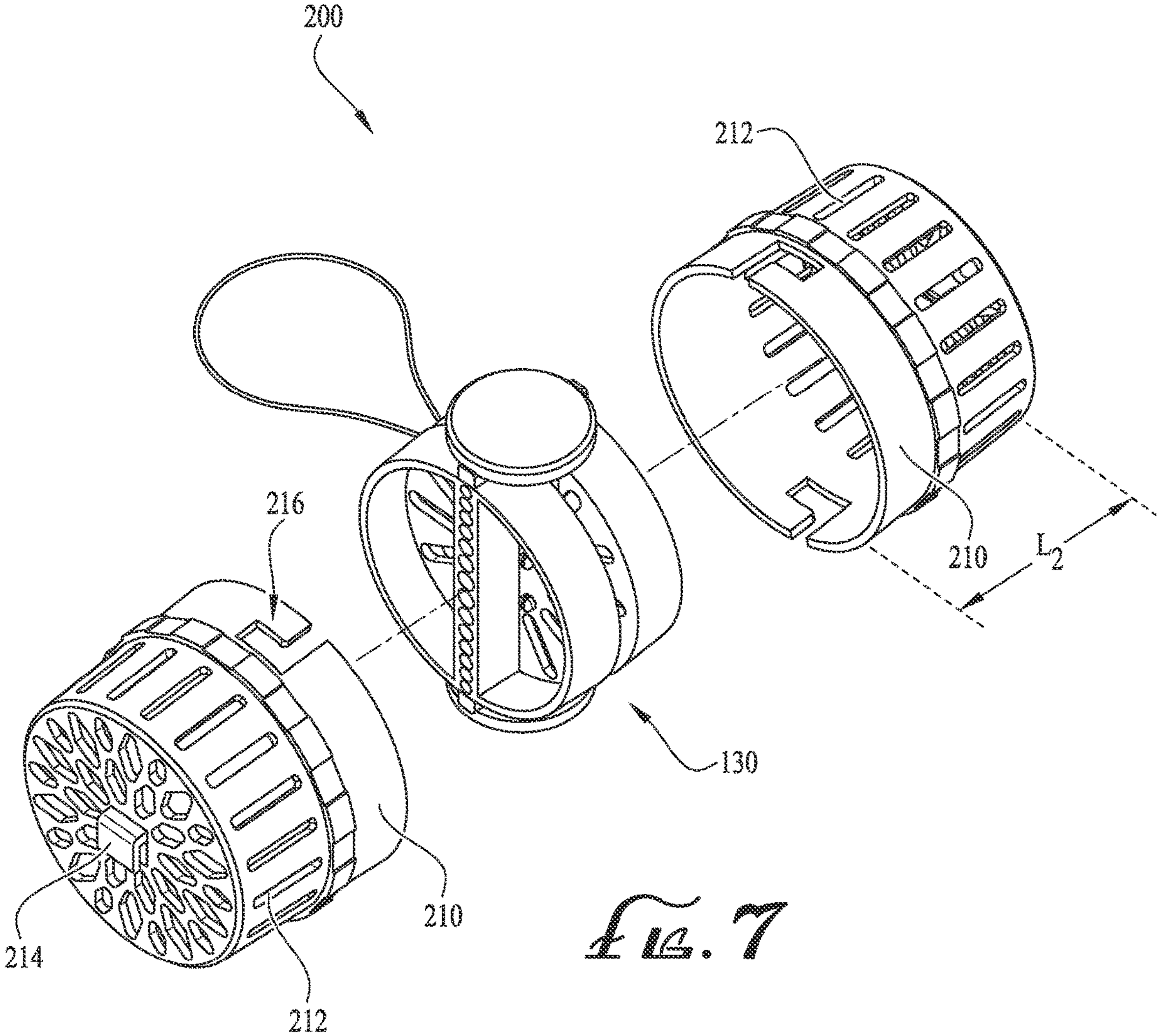
FIG. 7 is an exploded view of a shoelace cleaning device according to another example embodiment of the present invention.

In other example embodiments, the shoelace cleaning device can be provided with shorter containment shells to reduce the overall length of the shoelace cleaning device. FIG. 7 shows a compact version of the shoelace cleaning device. The compact shoelace cleaning device 200 is provided with shorter containment shells 210. According to example embodiments, the containment shells 210 comprise lengths $L_2$ between about 1 inches and 4 inches, or more preferably between about 2 inches and 2.5 inches. The containment shells 210 comprise a hollow puck-like profile with a flat closed end. In example embodiments, the compact shoelace cleaning device 200 incorporates the same central hub 130 described above. Further, the shorter containment shells 210 also include perforations 212, clasps 214 and locking grooves 218. According to example embodiments, the compact shoelace cleaning device 200 provides convenience of a smaller device, such as for example easier transportation thereof while traveling. According to one example embodiment, the device is sized and shaped to fit within a drinking cup, for example, that is at least partially containing a liquid (e.g., water, a cleaning agent, soap, etc.) such that the at least one shoelace contained within the device can undergo a presoaking process prior to the washing thereof.

According to example embodiments the present invention also relates to a method of cleaning/drying one or more shoelaces. In example embodiments, the shoelace cleaning device 100, while containing one or more shoelaces therein, can be placed within a washing device (e.g., clothes washing machine according to one example) so as to permit the cleaning of the one or more shoelaces L while containing the same within the at least one containment space defined by the perforated containment shells 110 and central hub 130. Optionally, the ends of the one or more shoelaces L can be secured to the shoelace end receivers 132 of central hub 130 before detachably securing the containment shells 110 to the central hub. Securing the one or more shoelaces L to the receivers 132 better ensures that the one or more shoelaces do not get tangled during the washing cycle and further reduce wrinkles. Securing the ends of the one or more shoelaces L to the receivers 132 also provides protection to the aglets which can deform and/or get damages during washing cycles. According to one example embodiment, an object or other agitating piece/component can be inserted in the containment area holding the at least one shoelace so as to help agitate the same for removing dirt and other unwanted materials from the at least one shoelace.

After washing the shoelace(s) while being contained within the shoelace cleaning device 100, a drying method can be provided so as to dry the one or more shoelaces. If the ends of the one or more washed shoelaces are not already secured to the receivers 132, the ends are secured to the receivers 132 leaving portions of the one or more shoelaces hanging loose. One or both of the containment shells 110 are slipped or hooked onto the hanging portions of the one or more shoelaces via clasps 114. Securing the containment shells 110 to the hanging portions of the shoelaces provides at least some weight to weigh down and stretch the shoelaces as they hang dry such as to prevent wrinkles or creases from forming along one or more portions of the shoelaces as they dry. Alternatively, and/or optionally, the shoelaces can be looped through a portion of one of the perforated containment shells 110 before the ends of the shoelaces are secured to the receivers 132 of the central hub.

With the coupling member 137 suspending the central hub 130 from an anchor point or a clothes hanger hooked onto an anchor point, the perforated containment shell 110 is suspended below the central hub by the one or more shoelaces (see FIG. 5). According to example embodiments, the central hub 130 acts to provide engagement for suspending the same, and the shoelace(s) connected therewith can be expanded or looped such that they promote the drying thereof. Furthermore, with at least one perforated containment shell 110 secured to the cleaned shoelace(s) by clasp 114 (or for example, the shoelace(s) being threaded through at least a portion of at least one of the perforated containment shells), the shoelace(s) can be dried in a manner so as to prevent wrinkles or creases from being formed along one or more portions of the shoelace(s).

According to one example, the shoelace cleaning device 100 can act to provide multiple functionalities beyond solely containing one or more shoelaces while washing the same. For example, according to one example embodiment, one or more portions of the shoelace cleaning device can be inserted in one or more shoes. For example, according to some example embodiments, the shoelace cleaning device can additionally act to maintain the shoe's structure and shape, for example, like a shoe tree. For example, as depicted in FIG. 6, at least one portion of the shoe cleaning device (i.e., perforated containment shells 110) is fitted within each of the shoes, for example, at least within each shoe near the forefoot portions thereof. According to example embodiments, one or more portions of the shoelace cleaning device 100 can be shaped similarly to a shoe tree, or for example, shaped at least somewhat similar to at least one foot so as to support the shoe while inserted therein, and thus, maintain the shoe's shape by at least partially occupying a cavity of the shoe that is intended to receive the foot. According to example embodiments, the perforated containment shells 110 permit the shoes to breathe while inserted therein, for example, so as to facilitate the drying thereof (or for example, to promote evaporation of moisture that may be present therein). According to one example embodiment, one or more components can be incorporated with the shoelace cleaning device, for example, one or more replaceable scent-emitting or scent-absorbing devices, for example, such as a shoe freshener of some kind. In other example embodiments, for example, one or more moisture absorbing devices, for example, such as desiccant packets, may be added to the containment spaces or removably attached to the containment shells 110.

According to one example embodiment, one of the perforated containment shells is generally shaped similar to a user's right foot and the other of the perforated containment shells is generally shaped similar to the user's left foot.

According to example embodiments, the shoelace cleaning device 100 can be provided for sale in a retail store as a separate product, for example, such that a user can clean the shoelaces of their shoes and for example, use the same as shoe trees or supports while they're not being worn. According to another example embodiment, the shoelace cleaning device 100 can be provided with the purchase of a pair of shoes, for example, wherein at least one component of the shoelace cleaning device is inserted within each shoe to act as a support/stability component (e.g., similar to shoetrees) rather than known support components for new shoes, such as for example stuffing paper. Thereafter, once the user desires to clean the shoelaces of the shoes, the shoelace cleaning device can be used to clean the shoelaces as described herein. In other example embodiments, the shoelace cleaning device 100 can be provided as desired with the purchase of a new pair of shoes, for example, which can further include one or more extra pairs of shoelaces as desired, for example, which may be provided in various colors, styles, patterns, sizes, lengths, etc.

In optional example embodiments, the shoelace cleaning device as described herein can be sized, shaped and configured as desired. According to example embodiments, the at least one of the components of the device 100 is formed from plastic. In other example embodiments, one or more components of the device 100 can be formed from various other materials including but not limited to plastics, polymers, composites, rubbers, silicones, foams, natural materials, synthetic materials, and/or other materials and/or combinations thereof. In example embodiments, the material(s) used with the device can be rigid, flexible, and/or some variation of the two. According to one example embodiment, at least one or more portions of the device are formed from a foam resin, for example, Croslite™, or for example, ethylene-vinyl acetate (EVA) comprising ethylene and vinyl acetate. According to one example embodiment, the vinyl acetate makes up anywhere from 10-40 percent of the copolymer, and the remainder is made up of the ethylene. In yet other example embodiments, at least some portions of the device 100 can be formed from scent emitting or odor and/or moisture absorbing materials.

According to example embodiments, the device 100 is configured to contain at least one shoelace while the same is inserted within a washing machine and undergoes at least one washing cycle. According to another example embodiment, the device is configured to contain at least one shoelace while undergoing at least one washing cycle within a dishwasher. According to another example embodiment, the device is configured to contain at least one shoelace while undergoing at least one washing cycle by manual agitation of the user while inserted within a bowl or cup containing cleaning detergent and water.

According to another example embodiment, the device 100 is configured to assist in drying the at least one shoelace after the washing thereof (and prevent wrinkles/creases in the at least one shoelace).

According to another example embodiment, the device 100 can comprise a shoehorn for assisting the user in inserting their feet in the shoes.

According to another example embodiment, other garments, clothing and accessories (or athletic accessories, such as for example headbands, arm sleeves, mouthpieces, sweat bands, bracelets, bands, arm and/or leg straps/bands) can be contained temporarily within the device 100 such that the same can undergo at least one washing cycle by machine or manual manipulation thereof.

According to another example embodiment, the device 100 can be sized and shaped so as to contain at least one shoe therein, for example, such that the at least one shoe can undergo at least one washing cycle (e.g., a shoe cleaning device). According to one example embodiment, the device is configured to temporarily contain two shoes while undergoing a washing process, for example, which can be performed by a machine such as a washing machine or a dishwasher, or for example, which can be performed by manual manipulation by a user. According to one example embodiment, the device is formed from Croslite™ (as previously described above), for example, such that the same does not cause damage to the washing device (e.g., the washing machine) during the washing cycle thereof. As previously described above, the container for the temporary containment of at least one shoe for washing of the same is preferably at least partially perforated.

While the invention has been described with reference to preferred and example embodiments, it will be understood by those skilled in the art that a variety of modifications, additions and deletions are within the scope of the invention, as defined by the following claims.

What is claimed is:

1. A reconfigurable shoelace cleaning-and-drying system for containing one or more shoelaces through at least one wash cycle in a first washing configuration and retaining the one or more shoelaces to hang dry from an elevated anchor point in a second drying configuration, the reconfigurable shoelace cleaning system comprising:

a central hub having at least one locking protrusion, a string loop for suspending the central hub from the elevated anchor point, one or more bumpers, and one or more receivers configured to releasably retain ends of the one or more shoelaces in the first washing and second drying configurations; and at least one perforated containment shell having an open end and a closed end opposite the open end, the open end comprising a locking groove configured to interlock with the at least one locking protrusion of the central hub in the first washing configuration and the closed end comprising a clasp adapted to detachably grip onto and weigh down at least a portion of the one or more shoelaces in the second drying configuration.

2. The shoelace cleaning system of claim 1, wherein the at least one perforated containment shell is shaped to maintain the shape of a shoe when the containment shell is placed in the shoe in a third shoetree configuration.

3. The shoelace cleaning system of claim 2, wherein the at least one perforated containment shell is wedge-shaped.

4. The shoelace cleaning device of claim 1, wherein at least one of the one or more bumpers comprises a channel for retaining a portion of the shoelace therein.

5. A method of washing and drying at least one shoelace in a shoelace cleaning device comprising at least one perforated shell having a shoelace clasp mounted thereon and at least one center hub having at least one receiver for retaining at least one end of the at least one shoelace, the method of washing comprising:

placing the at least one shoelace inside the at least one perforated shell;

detachably securing the at least one perforated shell to the center hub to form a cage assembly to retain the at least one shoelace therein;

placing the cage assembly in a washing medium to undergo at least one washing cycle;

detaching the at least one perforated shell from the center hub and removing the at least one shoelace from the cage assembly;

securing one or both ends of the at least one shoelace into the at least one receiver;

detachably securing the at least one perforated shell by the shoelace clasp to a loose end or portion of the at least one shoelace not retained in the receiver; and suspending the at least one center hub from an elevated height to hang dry the at least one shoelace retained by the at least one center hub at a first, upper end of the at least one shoelace and weighed down by the at least one perforated shell detachably clasped to a loose second, lower end of the at least one shoelace.

6. The method of washing and drying at least one shoelace in a shoelace cleaning device of claim 5, wherein the washing medium is water.

7. The method of washing and drying at least one shoelace in a shoelace cleaning device of claim 5, wherein the washing medium is a mixture or a solution comprising water and a detergent.

8. The method of claim 5, further comprising the step of securing one or both ends of the at least one shoelace into the at least one receiver prior to detachably securing the at least one perforated shell to the center hub.

* * * * *